United States Patent
Chen et al.

(10) Patent No.: US 11,644,721 B2
(45) Date of Patent: May 9, 2023

(54) DISPLAY PANEL AND DISPLAY DEVICE

(71) Applicant: TCL CHINA STAR OPTOELECTRONICS TECHNOLOGY CO., LTD., Guangdong (CN)

(72) Inventors: Xingwu Chen, Guangdong (CN); Mei Chen, Guangdong (CN); Xin Zhang, Guangdong (CN); Lixuan Chen, Guangdong (CN); Dongze Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 392 days.

(21) Appl. No.: 16/767,902

(22) PCT Filed: Apr. 21, 2020

(86) PCT No.: PCT/CN2020/085988
§ 371 (c)(1),
(2) Date: May 28, 2020

(87) PCT Pub. No.: WO2021/203483
PCT Pub. Date: Oct. 14, 2021

(65) Prior Publication Data
US 2022/0317523 A1    Oct. 6, 2022

(30) Foreign Application Priority Data

Apr. 10, 2020   (CN) .......................... 202010277518.5

(51) Int. Cl.
*G02F 1/1343*    (2006.01)
*G02F 1/1337*    (2006.01)

(52) U.S. Cl.
CPC .. *G02F 1/134336* (2013.01); *G02F 1/133707* (2013.01); *G02F 1/134309* (2013.01); *G02F 2201/52* (2013.01)

(58) Field of Classification Search
CPC ......... G02F 1/133707; G02F 1/134309; G02F 1/1393; G02F 1/134336; G02F 2201/123;
(Continued)

(56) References Cited

U.S. PATENT DOCUMENTS

2004/0004690 A1    1/2004  Yamaguchi
2004/0044690 A1*   3/2004  Kanzinger ........... G06Q 10/107
(Continued)

FOREIGN PATENT DOCUMENTS

CN    103676351 A    3/2014
CN    105137674 A    12/2015
(Continued)

*Primary Examiner* — Jia X Pan
(74) *Attorney, Agent, or Firm* — PV IP PC; Wei Te Chung; Ude Lu

(57) ABSTRACT

A display panel and a display device are disclosed. The display panel includes upper and lower substrates, a liquid crystal layer, a first electrode, and a second electrode. The second electrode includes at least a stem electrode and a plurality of branch electrodes. A plurality of subpixel areas are provided, and each of the subpixel areas is divided into at least four liquid crystal domains by the stem electrode. The subpixel area in corresponding one of the liquid crystal domains is further divided to form a partition-like structure to increase number of liquid crystal domains, so that light transmittance and display quality can be improved.

18 Claims, 6 Drawing Sheets

(58) Field of Classification Search
CPC ......... G02F 2201/122; G02F 1/133514; G02F 2201/52
See application file for complete search history.

(56) References Cited

U.S. PATENT DOCUMENTS

| | | |
|---|---|---|
| 2011/0141420 A1* | 6/2011 | Chen ................ G02F 1/134309 349/129 |
| 2012/0200806 A1 | 8/2012 | Inoue |
| 2013/0201430 A1 | 8/2013 | Fan et al. |
| 2015/0015829 A1* | 1/2015 | Chen ................ G02F 1/133707 349/96 |
| 2015/0253638 A1 | 9/2015 | Lim et al. |
| 2016/0147118 A1 | 5/2016 | Lee et al. |
| 2016/0202543 A1* | 7/2016 | Park .................... G02F 1/13394 349/42 |
| 2017/0059945 A1 | 3/2017 | Yeh et al. |
| 2017/0131599 A1 | 5/2017 | Yim et al. |
| 2017/0235194 A1* | 8/2017 | Shin .................... G02F 1/13439 349/139 |
| 2018/0136523 A1 | 5/2018 | Chen et al. |

FOREIGN PATENT DOCUMENTS

| | | |
|---|---|---|
| CN | 105182650 A | 12/2015 |
| CN | 105487310 A | 4/2016 |
| CN | 106873257 A | 6/2017 |
| CN | 110824789 A | 2/2020 |
| CN | 111308806 A | 6/2020 |
| TW | 201245826 A | 11/2012 |

* cited by examiner

DISPLAY PANEL AND DISPLAY DEVICE

BACKGROUND OF INVENTION

1. Field of Invention

The present invention relates to a technical field of displays, and particularly to, a display panel and a display device.

2. Related Art

Liquid crystal displays (LCDs) have been widely used due to advantages of being compact, power saving, no radiation, etc.

Currently, polymer stabilized vertical alignment (PSVA) technology is commonly used in a vertical alignment mode of liquid crystal displays, which has advantages of high contrast and quick response times. However, in the current PSVA technology, it is necessary to use ultraviolet irradiation in cell-assembly processes. But, under a pixel structure created by such a manner, there will inevitably be a certain area around pixels failing to operate normally and tending to form dark stripe areas, thereby adversely affecting display performance. Furthermore, in current multi-domain pixel structures, in order to increase number of domains of pixel structures, pixels are forced to have low aperture ratios, low light transmittance, and poor viewing angles.

Therefore, it is imperative to provide a solution to overcome problems in the prior art.

Accordingly, in current devices such as liquid crystal displays, there are dark stripe areas occurred in liquid crystal displays when displaying. Furthermore, there is a problem, such as low aperture ratios of pixels, low light transmittance, and pool viewing angles, with multi-domain pixel structures.

SUMMARY OF INVENTION

In order to overcome the above-mentioned problem, the present disclosure is to provide a display panel and a display device to address a problem that dark stripe areas occurred in conventional liquid crystal displays when displaying, and drawbacks of conventional multi-domain pixel structures, such as low aperture ratios, low light transmittance, and pool viewing angles.

In order to achieve the above-mentioned object, an embodiment of the present disclosure provides a technical solution as follows:

According to a first aspect of an embodiment of the present disclosure, the present disclosure provides a display panel comprising a first substrate; a second substrate disposed opposite to the first substrate; a liquid crystal layer sandwiched between the first substrate and the second substrate; a first electrode disposed on a side of the first substrate adjacent to the liquid crystal layer; a second electrode disposed on a side of the second substrate adjacent to the liquid crystal layer; and a plurality of pixel units arranged in an array; wherein the pixel units comprise a plurality of subpixel areas, the second electrode comprises at least a stem electrode and a plurality of branch electrodes disposed in corresponding one of the subpixel areas, each of the subpixel areas is divided into at least four liquid crystal domains by the stem electrode, each of the liquid crystal domains comprises a plurality of the branch electrodes spaced apart from each other, and the branch electrodes in adjacent two of the liquid crystal domains extend in different directions; wherein the stem electrode is disposed at an angle with respect to a first direction or a second direction, wherein the first direction is a horizontal direction and the second direction is a vertical direction, wherein the stem electrode comprises a first stem electrode and a second stem electrode, and the branch electrodes in each of the liquid crystal domains are disposed in parallel with and equally spaced apart from each other.

According to one embodiment of the present disclosure, the first stem electrode intersects the second stem electrode, the first stem electrode is connected to two opposite sides of the subpixel area, and the second stem electrode is connected to another two opposite sides of the subpixel area.

According to one embodiment of the present disclosure, the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

According to one embodiment of the present disclosure, an angle between the first stem electrode and the first direction and an angle between the second stem electrode and the second direction are between 0°-25°, respectively.

According to one embodiment of the present disclosure, the first stem electrode is divided into two parts by the second stem electrode, and the first stem electrode and the second stem electrode intersect at a first intersection point and a second intersection point.

According to one embodiment of the present disclosure, each of the first stem electrode and the second stem electrode has a bending line structure, and the first stem electrode and the second stem electrode overlap at the bending line structure.

According to one embodiment of the present disclosure, each of the subpixel areas is provided with a red subpixel, a green subpixel, and a blue subpixel, wherein one of the red subpixel, the green subpixel, or the blue subpixel is defined as a primary subpixel, the other ones of the red subpixel, the green subpixel, and the blue subpixel are defined as second subpixels, and the second subpixels are disposed surrounding the primary subpixel, wherein a spacing is provided between the primary subpixel and the second subpixels.

According to one embodiment of the present disclosure, there are a plurality of the primary subpixels connected to at least a lead.

According to a second aspect of an embodiment of the present disclosure, the present disclosure further provides a display panel, comprising a first substrate; a second substrate disposed opposite to the first substrate; a liquid crystal layer sandwiched between the first substrate and the second substrate; a first electrode disposed on a side of the first substrate adjacent to the liquid crystal layer; a second electrode disposed on a side of the second substrate adjacent to the liquid crystal layer; and a plurality of pixel units arranged in an array; wherein the pixel units comprise a plurality of subpixel areas, the second electrode comprises at least a stem electrode and a plurality of branch electrodes disposed in corresponding one of the subpixel areas, each of the subpixel areas is divided into at least four liquid crystal domains by the stem electrode, each of the liquid crystal domains comprises a plurality of the branch electrodes spaced apart from each other, and the branch electrodes in adjacent two of the liquid crystal domains extend in different directions; wherein the stem electrode is disposed at an angle with respect to a first direction or a second direction, wherein the first direction is a horizontal direction and the second direction is a vertical direction.

According to one embodiment of the present disclosure, the branch electrodes in each of the liquid crystal domains are disposed in parallel with and equally spaced apart from each other.

According to one embodiment of the present disclosure, the stem electrode comprises a first stem electrode and a second stem electrode, the first stem electrode intersects the second stem electrode, the first stem electrode is connected to two opposite sides of the subpixel area, and the second stem electrode is connected to another two opposite sides of the subpixel area.

According to one embodiment of the present disclosure, the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

According to one embodiment of the present disclosure, an angle between the first stem electrode and the first direction and an angle between the second stem electrode and the second direction are between 0°-25°, respectively.

According to one embodiment of the present disclosure, the first stem electrode is divided into two parts by the second stem electrode, and the first stem electrode and the second stem electrode intersect at a first intersection point and a second intersection point.

According to one embodiment of the present disclosure, each of the first stem electrode and the second stem electrode has a bending line structure, and the first stem electrode and the second stem electrode overlap at the bending line structure.

According to one embodiment of the present disclosure, each of the subpixel areas is provided with a red subpixel, a green subpixel, and a blue subpixel, wherein one of the red subpixel, the green subpixel, or the blue subpixel is defined as a primary subpixel, the other ones of the red subpixel, the green subpixel, and the blue subpixel are defined as second subpixels, and the second subpixels are disposed surrounding the primary subpixel, wherein a spacing is provided between the primary subpixel and the second subpixels.

According to one embodiment of the present disclosure, there are a plurality of the primary subpixels connected to at least a lead.

According to a third aspect of an embodiment of the present disclosure, the present disclosure provides a display device, comprising a first substrate; a second substrate disposed opposite to the first substrate; a liquid crystal layer sandwiched between the first substrate and the second substrate; a first electrode disposed on a side of the first substrate adjacent to the liquid crystal layer; a second electrode disposed on a side of the second substrate adjacent to the liquid crystal layer; and a plurality of pixel units arranged in an array; wherein the pixel units comprise a plurality of subpixel areas, and the second electrode comprises at least a stem electrode and a plurality of branch electrodes disposed in corresponding one of the subpixel areas; wherein each of the subpixel areas is divided into at least four liquid crystal domains by the stem electrode, each of the liquid crystal domains comprises a plurality of branch electrodes spaced apart from each other, and the branch electrodes in adjacent two of the liquid crystal domains extend in different directions; wherein each of the subpixel areas is provided with a primary pixel and a plurality of second subpixels surrounding the primary pixel, wherein a spacing is provided between the primary subpixel and the second subpixels, and when different voltages are applied to the primary subpixel and the second subpixels, liquid crystal molecules in the liquid crystal layer are provided in three different types of inversions.

According to one embodiment of the present disclosure, the branch electrodes in each of the liquid crystal domains are disposed in parallel with and equally spaced apart from each other.

According to one embodiment of the present disclosure, the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

The embodiment of the present disclosure has advantageous effects as follows: the disclosed embodiment provides a display panel and a display device. In disposing pixel electrodes of the display panel, at least a stem electrode is disposed in corresponding one of subpixel areas, and each of the subpixel areas is divided into at least four liquid crystal domains by the stem electrode. In addition, each of the subpixel areas includes a primary subpixel and a plurality of second subpixels, and a spacing is provided between the primary subpixel and the second subpixels. When different voltages are applied to the primary subpixel and the second subpixels, liquid crystal molecules in the display panel are provided in three different types of inversions, so that the display panel can obtain more liquid crystal domain regions while keeping number of thin-film transistors unchanged, thereby increasing light transmittance, improving viewing angles of the display panel, and improving display quality.

DESCRIPTION OF PREFERRED EMBODIMENTS

The following embodiments are referring to the accompanying drawings for exemplifying specific implementable embodiments of the present invention.

With development of display technology, performance requirements of liquid crystal displays are getting higher and higher. Current liquid crystal display devices still have problems such as serious color shift at large viewing angles and relatively poor viewing angles, especially in display devices with a multi-domain design structure. With an increase in number of thin-film transistors, the loss of aperture ratios of display panels is serious, penetration rates of light are reduced, and finally display quality of panels is reduced, thereby adversely affecting improvement of comprehensive performance of the display panels.

An embodiment of the present disclosure provides a display panel. The display panel can obtain more liquid crystal domain regions while keeping number of existing thin-film transistors unchanged, thereby increasing light transmittance, improving viewing angles, reducing dark phenomenon, and improving display quality of the liquid crystal panel.

Figure 1:
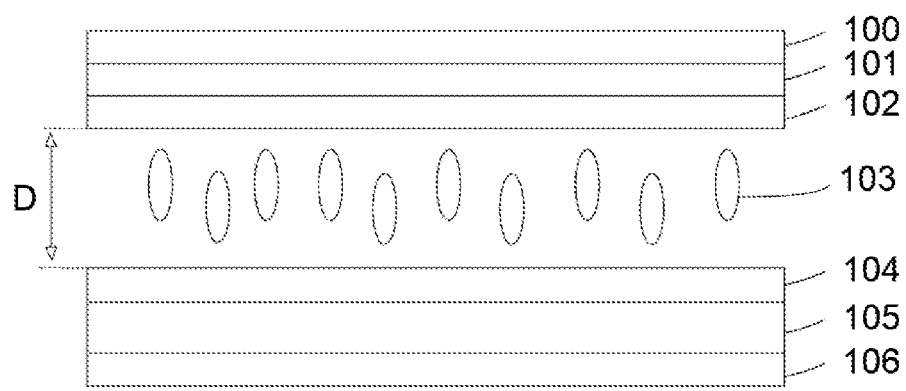
FIG. 1 is a schematic structural view of a display panel provided by an embodiment of the present disclosure.

As shown in FIG. 1, FIG. 1 is a schematic structural view of a display panel provided by an embodiment of the present disclosure. The display panel includes a first polarizer 100, a first substrate 101, a second substrate 105, a liquid crystal layer 103, and a second polarizer 106.

The first substrate 101 and the second substrate 105 are disposed opposite to each other, and the liquid crystal layer 103 is sandwiched between the first substrate 101 and the second substrate 105. In addition, the first polarizer 100 is disposed on a side of the first substrate 101 away from the liquid crystal layer 103, and the second polarizer 106 is disposed on a side of the second substrate 105 away from the liquid crystal layer 103.

In a disclosed embodiment, in a polymer stabilized vertical alignment (PSVA) liquid crystal display type liquid crystal display, ultraviolet irradiation is used in a cell-assembly process, so that liquid crystals are reversed in one direction, and ultraviolet irradiation is used to polymerize polymerizable monomers in the liquid crystals, and finally the liquid crystals are positioned at certain pretilt angles. However, in conventional pixel structure design, dark stripe areas often appear.

In order to solve a dark strip phenomenon, in an embodiment of the present disclosed, the liquid crystal layer 103 further includes a chiral agent. The chiral agent is used to enable liquid crystal molecules to periodically rotate in the liquid crystal layer 103. A spiral twist force generated by the chiral agent drives the liquid crystal molecules around the pixel to rotate, thereby effectively reducing a width of the dark strip areas around the pixel, making a cell-assembly design variable, and maximally increasing a transmittance rate of a liquid crystal display device, so that high transmittance rate displaying can be achieved.

Further, the chiral agent includes a left-handed chiral agent or a right-handed chiral agent. In order to ensure transmittance of the liquid crystal display device, the adding of the chiral agent also needs to match an optical path difference Δnd of the liquid crystal, that is, a product of a liquid crystal phase difference and a thickness of a liquid crystal cell, thereby to achieve a maximum transmittance.

In a disclosed embodiment, after adding the chiral agent, a helical pitch of liquid crystal in the liquid crystal layer 103 is maintained between 8 micros (μm) and 60 μm. In addition, the liquid crystal in this embodiment is described by taking negative liquid crystal as an example. The liquid crystal is injected into the liquid crystal layer 103 through an inkjet printing process, so that the Δnd of the liquid crystal is between 300 nanometers (nm) and 550 nm, and the chiral agent is increased in the liquid crystal.

Preferably, the liquid crystal layer 103 has a thickness D between 2.5 μm and 4 μm, and a spacing among liquid crystals in the liquid crystal layer 103 is 2 to 10 times the thickness D of the liquid crystal layer 103, thereby to maximize light transmittance of the liquid crystal display during a PSVA process.

Preferably, in a disclosed embodiment, the display panel further includes a plurality of pixel units arranged in an array. The pixel units include a plurality of subpixel areas. In addition, the display panel further includes a first electrode 102 and a second electrode 104 provided corresponding to the pixel units.

The first electrode is disposed on a side of the first substrate 101 adjacent to the liquid crystal layer 103, and the second electrode 104 is disposed on a side of the second substrate 105 adjacent to the liquid crystal layer 103, thereby to achieve a structure of two substrates arranged opposite to each other in an upper and lower relation and two electrodes disposed opposite to each other.

Figure 2:
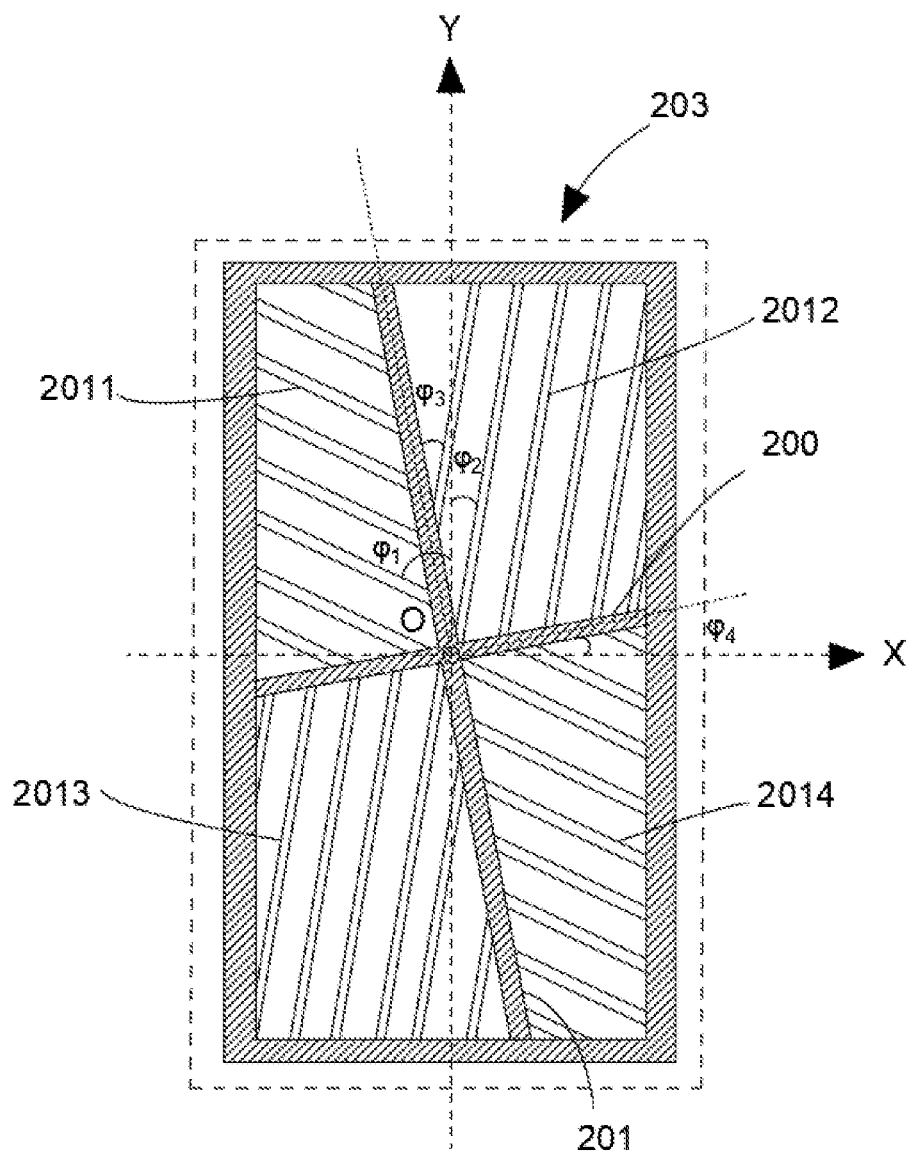
FIG. 2 is a schematic structural view of a second electrode in an embodiment of the present disclosure.

As shown in FIG. 2, FIG. 2 is a schematic structural view of a second electrode in an embodiment of the present disclosure. A subpixel area 203 is provided with the second electrode, wherein the second electrode includes at least a stem electrode and a plurality of branch electrodes. The subpixel area 203 is divided into at least four liquid crystal domains by the stem electrode. Each of the liquid crystal domains includes a plurality of the branch electrodes spaced apart from each other, and the branch electrodes in adjacent two of the liquid crystal domains extend in different directions.

Specifically, in a disclosed embodiment, the second electrode includes a first stem electrode 200 and a second stem electrode 201 as an example for description. An overall structure of the second electrode is described by taking a rectangular or square shape as an example. The first stem electrode 200 intersects the second stem electrode 201 at an intersection point O. The first stem electrode 200 is connected to two opposite sides of the subpixel area 203, and the second stem electrode 201 is connected to another two opposite sides of the subpixel area 203. In this manner, the first stem electrode 200 and the second stem electrode 201 jointly divides pixel electrodes in the subpixel area 203 into four liquid crystal domains. As shown in FIG. 2, the four liquid crystal domains include a first liquid crystal domain, a second liquid crystal domain, a third liquid crystal domain, and a fourth liquid crystal domain arranged in sequence.

Further, the first liquid crystal domain is provided with a plurality of first branch electrodes 2011, the second liquid crystal domain is provided with a plurality of second branch electrodes 2012, the third liquid crystal domain is provided with a plurality of third branch electrodes 2013, and the fourth liquid crystal domain is provided with a plurality of fourth branch electrodes 2014.

In a disclosed embodiment, adjacent two of the branch electrodes in each of the liquid crystal domains are disposed in parallel with and equally spaced apart from each other. The stem electrodes extend in different directions in corresponding one of the liquid crystal domains, and the branch electrodes in adjacent two of the liquid crystal domains extend in different directions, so that different voltages and electric fields are produced to drive the liquid crystal in corresponding area, enabling the liquid crystal to be oriented at different angles.

Specifically, in a disclosed embodiment, the first stem electrode 200 and the second stem electrode 201 may be perpendicular to each other.

In addition, when the first stem electrode 200, the second stem electrode 201, and the branch electrodes in each of the liquid crystal domains are provided, the first stem electrode 200 may or may not overlap a first direction X, and the second stem electrode 201 may or may not overlap a second direction Y, wherein the first direction X is a horizontal direction and the second direction Y is a vertical direction.

Specifically, in a disclosed embodiment, the first direction X may be a polarization axis X of the first polarizer, and the second direction Y may be a polarization axis Y of the second polarizer.

In configuring, as shown in FIG. 2, in the first liquid crystal domain, the first branch electrodes 2011 are disposed at an angle of φ1 with respect to the second direction Y.

In the second liquid crystal domain, the second branch electrodes 2012 are disposed at an angle of φ2 with respect to the second direction Y, the first stem electrode 200 is disposed at an angle of φ4 with respect to the first direction, and the second stem electrode 201 is disposed at an angle of φ3 with respect to the second direction Y.

In order to achieve the best light transmittance and visualization angle, in the embodiment of the present disclosure, for left-handed liquid crystal, the angle φ1 can be 60°-90°, and the angle φ2 plus the angle φ1 can be 80°-100°. For right-handed liquid crystal, the angle φ1 can be 0°-30°, and the angle φ2 plus the angle φ1 can be 80°-100°. Preferably, the angle φ3 and the angle φ4 may be 0°-25°, respectively.

By adjusting the angle between the stem electrodes and the first direction X or the second direction Y, light transmittance is maximized and display quality of the display panel is improved.

Figure 3:
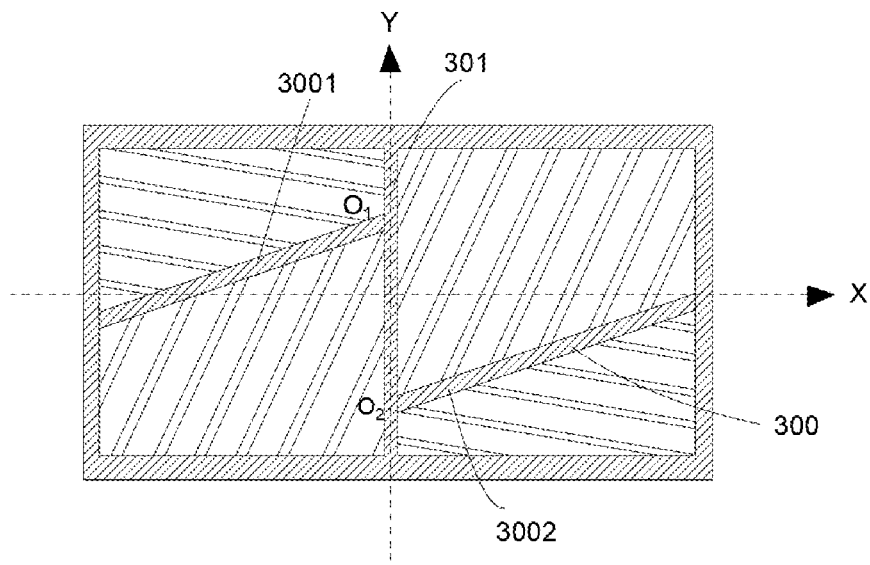
FIG. 3 is another schematic structural view of a second electrode in an embodiment of the present disclosure.

Preferably, as shown in FIG. 3, FIG. 3 is another schematic structural view of a second electrode in a disclosed embodiment. The second electrode includes a first steam electrode 300 and a second stem electrode 301. In a disclosed embodiment, the first stem electrode 300 is disposed at an angle with respect to the first direction X, and the second stem electrode 301 overlaps the second direction Y.

Specifically, the first stem electrode 300 is divided into two parts by the second stem electrode 301. That is, the first stem electrode 300 includes a first tilt electrode 3001 and a second tilt electrode 3002. The first tilt electrode 3001 intersects the second stem electrode 301 at an intersection point O1, and the second tile electrode 3002 intersects the second stem electrode 301 at an intersection point O2. That is, there is a dislocation formed between the first tilt electrode 3001 and the second tilt electrode 3002, and a dislocation distance is formed between the intersection points O1 and O2, thereby dividing the entire subpixel area into four liquid crystal domains.

Preferably, in order to increase light transmittance of the display panel, a length between the intersection points O1 and O2 is 3 μm and 25 μm. In addition, in configuring the branch electrodes and the corresponding stem electrodes in each of the liquid crystal domains, an angular relationship between the branch electrodes and the stem electrodes and the first direction X or the second direction Y is the same as that in FIG. 2 and will not be described in detail.

Figure 4:
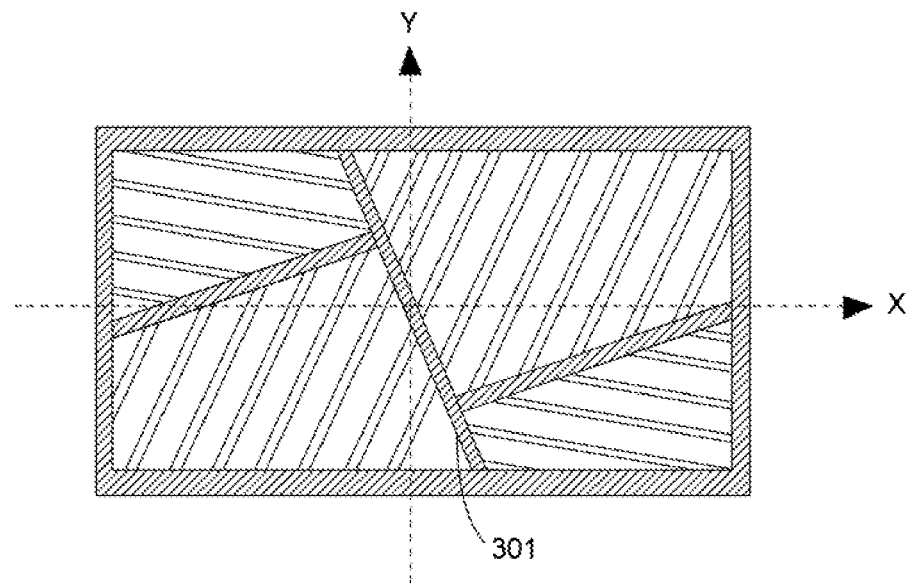
FIG. 4 is another schematic structural view of a second electrode in an embodiment of the present disclosure.

As shown in FIG. 4, FIG. 4 is another schematic structural view of a second electrode in a disclosed embodiment. Referring to FIG. 4 in combination with FIG. 3 for a schematic structural view of an electrode, a difference from the electrode shown in FIG. 3 lines in that in this embodiment of the present disclosure, the second stem electrode 301 is disposed at an angle with respect to the second direction Y. In addition, in this embodiment of the present disclosure, the first stem electrode 300 and the second stem electrode 301 intersect at two intersection points, so that a dislocation is formed between the two intersection points, wherein a dislocation distance is between 3 μm and 25 μm.

Figure 5:
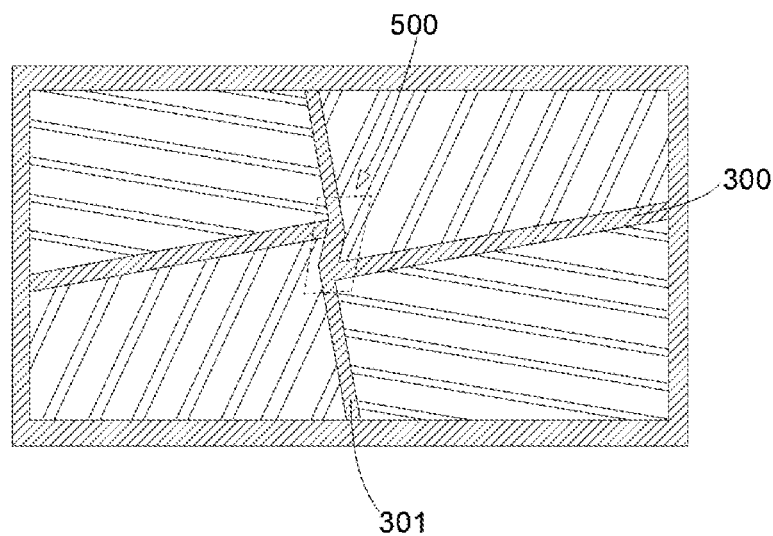
FIG. 5 is another schematic structural view of a second electrode in an embodiment of the present disclosure.

As shown in FIG. 5, FIG. 5 is another schematic structural view of a second electrode in a disclosed embodiment. Referring to FIG. 5 in combination with FIGS. 3 and 4 for an electrode structure, in this embodiment of the present disclosure, each of the first stem electrode 300 and the second stem electrode 301 is provided with a bending line structure and is connected to opposite two sides of a corresponding electrode frame. Specifically, the first stem electrode 300 and the second stem electrode 301 overlap at a bending line structure 500. The first stem electrode 300 is provided with two bending points at intersection points of the first and second stem electrodes, and a dislocation distance is formed between the intersection points.

The second electrode can also be configured in other shapes, which mainly aims to divide a subpixel area into different liquid crystal domains, so that the light transmittance is increased, thereby improving the display quality. Any design with the same structure as in the disclosed embodiments is within the scope of the present protection.

Figure 6:
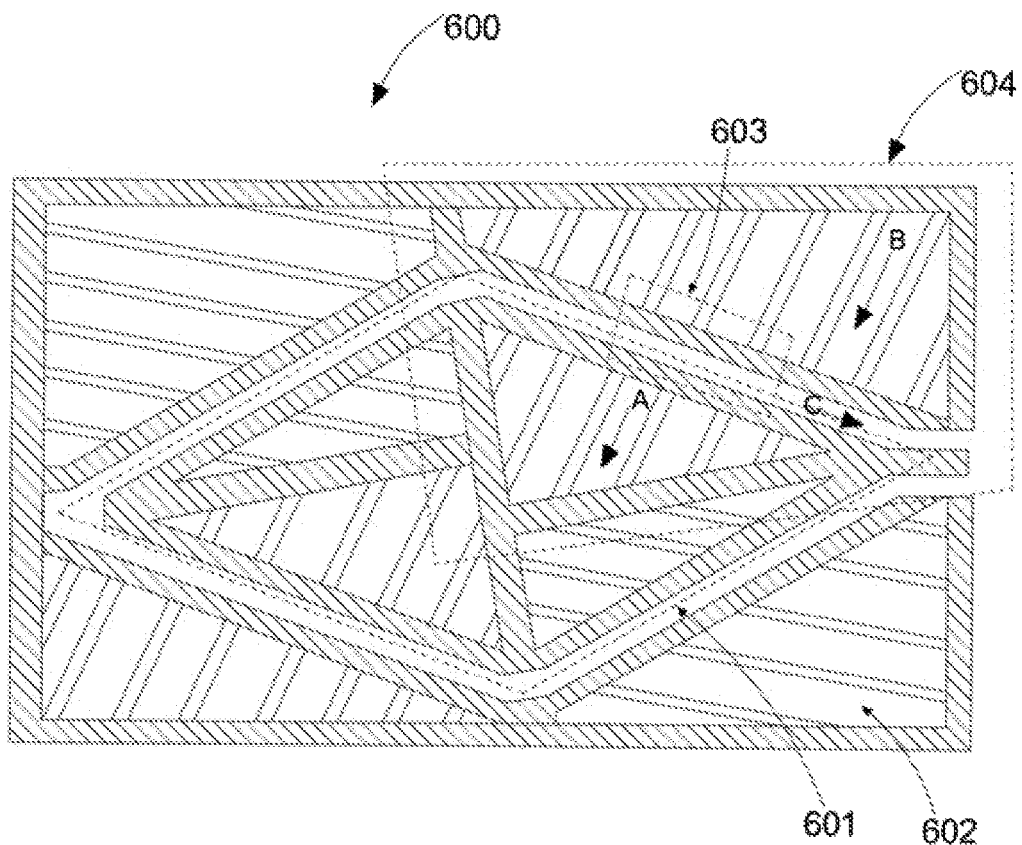
FIG. 6 is a schematic structural view of a pixel in an embodiment of the present disclosure.

Further, as shown in FIG. 6, FIG. 6 is a schematic structural view of a pixel in an embodiment of the present disclosure. A pixel structure 600 is provided with a red subpixel, a green subpixel, and a blue subpixel. In a disclosed embodiment, the pixel structure 600 is divided into a primary subpixel area 601 and a plurality of second subpixel areas 602 surrounding the primary subpixel area 601, and a spacing 603 is provided between the primary subpixel area 601 and the second subpixel areas 602. In addition, each of the areas is provided with a pixel electrode structure.

In a disclosed embodiment, the pixel structure 600 originally provided with eight liquid crystal domains is further divided. Therefore, after being divided, each of the liquid crystal domains is divided into two parts, that is, the two parts including the liquid crystal domains as originally provided make each of the original liquid crystal domains have liquid crystal domains in a number of three. As a result, each of the pixel areas includes 12 liquid crystal domains, so that, without increasing thin-film transistors, number of liquid crystal domains of the display panel increases, thereby increasing an aperture ratio of the display panel as well as improving display performance.

When a voltage is applied to a pixel electrode in the disclosed embodiment, since the voltage between the primary subpixel area 601 and the second subpixel area 602 is different, a voltage difference is produced between the two areas. Specifically, taking a second area 604 as an example, a liquid crystal inversion in a corresponding area in the primary subpixel area 601 is denoted by A, and a liquid crystal inversion in the corresponding area in the subpixel area 602 is denoted by B. Since the spacing 603 is provided between the primary subpixel area 601 and the second subpixel area 602, a corresponding liquid crystal inversion in the spacing 603 area is denoted by C. Therefore, there are three types of liquid crystal inversions provided in each of the liquid crystal domains. Each of the primary subpixel area 601 and the second subpixel area 602 is configured with four liquid crystal domains, so that a combination of the liquid crystal inversions A, B, and C substantially forms a 12-domain structure. Thereby, without increasing thin-film transistors, number of liquid crystal domains of the display panel is increased, an aperture ratio of the display panel is increased, and display performance is improved.

Preferably, in a disclosed embodiment, the spacing 603 has a width of 4 μm.

Figure 7A:
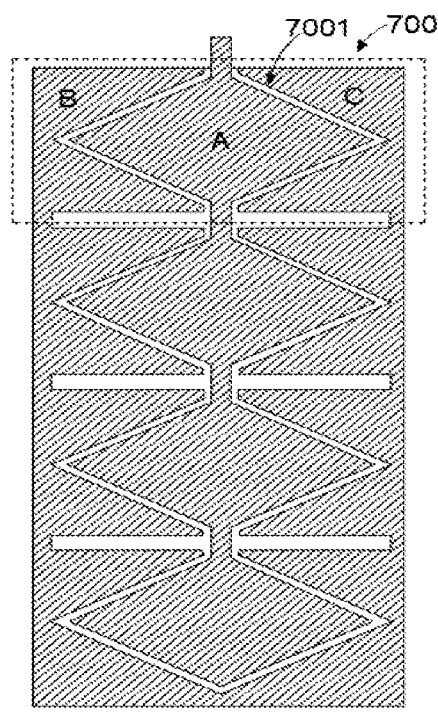
FIG. 7A is a schematic structural view showing a combination of subpixels in an embodiment of the present disclosure.

As shown in FIG. 7A, FIG. 7A is a schematic structural view showing a combination of subpixels in an embodiment of the present disclosure. Further, referring to FIG. 6, a plurality of subpixels 700 are arranged in an array to constitute an entire pixel structure.

In addition, each of the subpixels 700 is provided with a primary subpixel A, a second subpixel B, and a second subpixel C. Likewise, each of the subpixels 700 is divided. After being divided, the primary subpixel A can be provided with one of the red subpixel, the green subpixel, or the blue subpixel. Correspondingly, each of the second subpixels B and C is provided with subpixels of other colors. For example, as the primary subpixel A is the red subpixel, the second subpixel B is the blue subpixel, and the second subpixel C is the green subpixel; alternatively, as the second subpixel B is the green subpixel and the second subpixel C is the blue subpixel, the primary subpixel A may be the blue or green subpixel.

Preferably, a spacing 7001 is between 3 μm and 6 μm. In addition, adjacent two of the subpixels 700 is provided with a spacing between 2 μm and 6 μm, thereby to achieve a maximum of light transmittance of the display panel.

Figure 7B:
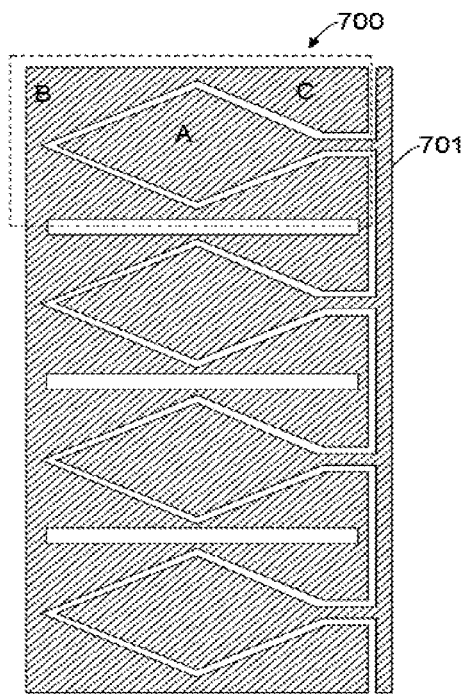
FIG. 7B is a schematic structural view showing another combination of subpixels in an embodiment of the present disclosure.

As shown in FIG. 7B, FIG. 7B is a schematic structural view showing another combination of subpixels in an embodiment of the present disclosure. Further, referring to a pixel structure in FIG. 7A, in a disclosed embodiment, a first lead 701 is disposed along a side of the pixel structure, and each of the primary subpixels A is electrically connected to the first lead 701, so that the primary subpixels A are each supplied with a voltage.

Figure 7C:
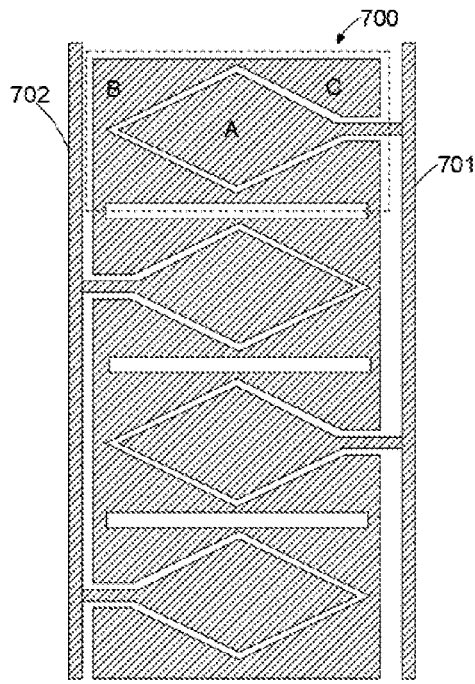
FIG. 7C is a schematic structural view showing another combination of subpixels in an embodiment of the present disclosure.

As shown in FIG. 7C, FIG. 7C is a schematic structural view showing another combination of subpixels in an embodiment of the present disclosure. Referring to FIG. 7C in combination with FIGS. 7A and 7B, in a disclosed embodiment, a first lead 701 and a second lead 702 are further provided. The first lead 701 and the second lead 702 are disposed on opposite sides of a pixel structure, wherein adjacent two of the primary subpixels A are connected to the first lead 701 and the second lead 702, respectively, thereby constituting the pixel structure shown in FIG. 7C.

Figure 8:
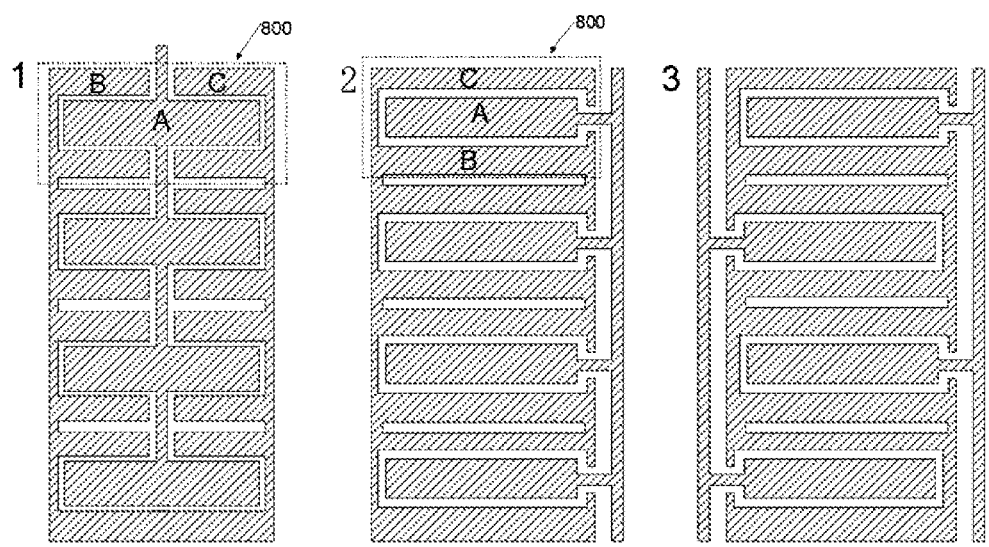
FIG. 8 is a schematic structural view of a rectangle primary subpixel in an embodiment of the present disclosure.

In a disclosed embodiment, the primary subpixel A is described by taking a rhombus structure as an example. Preferably, the primary subpixel A may also be rectangular or square in shape. As shown in FIG. 8, FIG. 8 is a schematic structural view of a rectangle primary subpixel in an embodiment of the present disclosure.

Likewise, each of subpixels 800 is divided into three parts. Specifically, a primary subpixel A is rectangular, and a second subpixel B and a second subpixel C are disposed surrounding the primary subpixel A. Structures 1, 2, and 3 in FIG. 8 are corresponding to FIGS. 7A, 7B, and 7C, respectively, and details are not reiterated.

In addition, an embodiment of the present disclosure further provides a display device. The display device includes the display panel described in the disclosed embodiments. The pixel electrodes and pixel structures in the display panel are arranged according to the structures and methods described in the embodiments of the present disclosure. The display device is displaying with high light transmittance and large viewing angles, thereby improving display quality.

The above describes the display panel and the display device provided by the embodiments of the present disclosure in detail. The descriptions of the above embodiments are only used to help understand the technical solutions and kernel ideas of the present disclosure; those of ordinary skill in the art should understand that they can still modify the technical solutions described in the foregoing embodiments, whereas these modifications or substitutions do not deviate the essence of the corresponding technical solutions from the scope of the technical solutions of the embodiments of the present disclosure.

What is claimed is:

1. A display panel, comprising:
a first substrate;
a second substrate disposed opposite to the first substrate;
a liquid crystal layer sandwiched between the first substrate and the second substrate;
a first electrode disposed on a side of the first substrate adjacent to the liquid crystal layer;
a second electrode disposed on a side of the second substrate adjacent to the liquid crystal layer; and
a plurality of pixel units arranged in an array;
wherein the pixel units comprise a plurality of subpixel areas, the second electrode comprises at least a stem electrode and a plurality of branch electrodes disposed in corresponding one of the subpixel areas, each of the subpixel areas is divided into at least four liquid crystal domains by the stem electrode, each of the liquid crystal domains comprises a plurality of the branch electrodes spaced apart from each other, and the branch electrodes in adjacent two of the liquid crystal domains extend in different directions, wherein each of the subpixel areas is provided with a red subpixel, a green subpixel, and a blue subpixel, wherein one of the red subpixel, the green subpixel, or the blue subpixel is defined as a primary subpixel, the other ones of the red subpixel, the green subpixel, and the blue subpixel are defined as second subpixels, and the second subpixels are disposed surrounding the primary subpixel, wherein a spacing is located between the primary subpixel and the second subpixels;
wherein the stem electrode is disposed at an angle with respect to a first direction or a second direction, wherein the first direction is a horizontal direction and the second direction is a vertical direction, wherein the stem electrode comprises a first stem electrode and a second stem electrode, and the branch electrodes in each of the liquid crystal domains are disposed in parallel with and equally spaced apart from each other.

2. The display panel of claim 1, wherein the first stem electrode intersects the second stem electrode, the first stem electrode is connected to two opposite sides of the subpixel area, and the second stem electrode is connected to another two opposite sides of the subpixel area.

3. The display panel of claim 1, wherein the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

4. The display panel of claim 2, wherein an angle between the first stem electrode and the first direction and an angle between the second stem electrode and the second direction are between 0°-25°, respectively.

5. The display panel of claim 2, wherein the first stem electrode is divided into two parts by the second stem electrode, and the first stem electrode and the second stem electrode intersect at a first intersection point and a second intersection point.

6. The display panel of claim 2, wherein each of the first stem electrode and the second stem electrode has a bending line structure, and the first stem electrode and the second stem electrode overlap at the bending line structure.

7. The display panel of claim 1, wherein there are a plurality of the primary subpixels connected to at least a lead.

8. A display panel, comprising:
a first substrate;
a second substrate disposed opposite to the first substrate;
a liquid crystal layer sandwiched between the first substrate and the second substrate;
a first electrode disposed on a side of the first substrate adjacent to the liquid crystal layer;
a second electrode disposed on a side of the second substrate adjacent to the liquid crystal layer; and
a plurality of pixel units arranged in an array;
wherein the pixel units comprise a plurality of subpixel areas, the second electrode comprises at least a stem electrode and a plurality of branch electrodes disposed in corresponding one of the subpixel areas, each of the subpixel areas is divided into at least four liquid crystal domains by the stem electrode, each of the liquid crystal domains comprises a plurality of the branch electrodes spaced apart from each other, and the branch electrodes in adjacent two of the liquid crystal domains extend in different directions, wherein each of the subpixel areas is provided with a red subpixel, a green subpixel, and a blue subpixel, wherein one of the red subpixel, the green subpixel, or the blue subpixel is defined as a primary subpixel, the other ones of the red subpixel, the green subpixel, and the blue subpixel are defined as second subpixels, and the second subpixels are disposed surrounding the primary subpixel, wherein a spacing is located between the primary subpixel and the second subpixels;
wherein the stem electrode is disposed at an angle with respect to a first direction or a second direction, wherein the first direction is a horizontal direction and the second direction is a vertical direction.

9. The display panel of claim 8, wherein the branch electrodes in each of the liquid crystal domains are disposed in parallel with and equally spaced apart from each other.

10. The display panel of claim 8, wherein the stem electrode comprises a first stem electrode and a second stem electrode, the first stem electrode intersects the second stem electrode, the first stem electrode is connected to two opposite sides of the subpixel area, and the second stem electrode is connected to another two opposite sides of the subpixel area.

11. The display panel of claim 10, wherein the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

12. The display panel of claim 10, wherein an angle between the first stem electrode and the first direction and an angle between the second stem electrode and the second direction are between 0°-25°, respectively.

13. The display panel of claim 10, wherein the first stem electrode is divided into two parts by the second stem electrode, and the first stem electrode and the second stem electrode intersect at a first intersection point and a second intersection point.

14. The display panel of claim 10, wherein each of the first stem electrode and the second stem electrode has a bending line structure, and the first stem electrode and the second stem electrode overlap at the bending line structure.

15. The display panel of claim 8, wherein there are a plurality of the primary subpixels connected to at least a lead.

16. A display device, comprising:
a first substrate;
a second substrate disposed opposite to the first substrate;
a liquid crystal layer sandwiched between the first substrate and the second substrate;
a first electrode disposed on a side of the first substrate adjacent to the liquid crystal layer;
a second electrode disposed on a side of the second substrate adjacent to the liquid crystal layer; and
a plurality of pixel units arranged in an array;
wherein the pixel units comprise a plurality of subpixel areas, and the second electrode comprises at least a stem electrode and a plurality of branch electrodes disposed in corresponding one of the subpixel areas;
wherein each of the subpixel areas is divided into at least four liquid crystal domains by the stem electrode, each of the liquid crystal domains comprises a plurality of the branch electrodes spaced apart from each other, and the branch electrodes in adjacent two of the liquid crystal domains extend in different directions;
wherein each of the subpixel areas is provided with a red subpixel, a green subpixel, and a blue subpixel, wherein one of the red subpixel, the green subpixel, or the blue subpixel is defined as a primary subpixel, the other ones of the red subpixel, the green subpixel, and the blue subpixel are defined as second subpixels, and the second subpixels are disposed surrounding the primary subpixel, wherein a spacing is located between the primary subpixel and the second subpixels, and when different voltages are applied to the primary subpixel and the second subpixels, liquid crystal molecules in the display panel are provided in three different types of inversions;
wherein the stem electrode is disposed at an angle with respect to a first direction or a second direction, and the first direction is a horizontal direction and the second direction is a vertical direction.

17. The display device of claim 16, wherein the branch electrodes in each of the liquid crystal domains are disposed in parallel with and equally spaced apart from each other.

18. The display device of claim 17, wherein the liquid crystal domains comprise a first liquid crystal domain provided with a plurality of first branch electrodes, and a second liquid crystal domain provided with a plurality of second branch electrodes, wherein the first branch electrodes are disposed at an angle with respect to the second direction, the second branch electrodes are disposed at an angle with respect to the second direction, and a sum of the two angles is between 80°-100°.

\* \* \* \* \*